US008774988B2

(12) United States Patent
Plowman et al.

(10) Patent No.: US 8,774,988 B2
(45) Date of Patent: Jul. 8, 2014

(54) AIRCRAFT ENVIRONMENTAL SENSORS AND SYSTEM

(75) Inventors: Larry A. Plowman, Grapevine, TX (US); Charles Eric Covington, Colleyville, TX (US); Brian E. Tucker, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 71 days.

(21) Appl. No.: 13/591,036

(22) Filed: Aug. 21, 2012

(65) Prior Publication Data
US 2014/0058594 A1 Feb. 27, 2014

(51) Int. Cl.
G06F 11/07 (2006.01)
G01M 17/00 (2006.01)

(52) U.S. Cl.
USPC .............................. 701/14; 701/30.8; 701/34.4

(58) Field of Classification Search
CPC ............ G06F 11/0739; G06F 11/0781; G06F 11/9787; G06F 11/079; G06F 15/0283
USPC ........ 701/14, 10, 29.1, 29.2, 29.9, 30.8, 31.8, 701/31.9, 34.4; 702/82, 184, 185; 714/37, 714/47.2; 340/425.5
See application file for complete search history.

(56) References Cited

U.S. PATENT DOCUMENTS 5,099,436 A * 3/1992 McCown et al. ................. 702/82
5,493,676 A * 2/1996 Amundson ...................... 714/42
6,473,677 B1 10/2002 Hershey et al.
6,684,349 B2 * 1/2004 Gullo et al. ................... 714/47.2
7,474,989 B1 1/2009 Wilcoxon
7,983,809 B2 7/2011 Kell et al.
7,984,146 B2 7/2011 Rozak et al.
8,515,599 B2 * 8/2013 De Cremoux et al. ............ 701/3
2002/0078403 A1 * 6/2002 Gullo et al. ...................... 714/37
2006/0150022 A1 * 7/2006 Malik .............................. 714/38
2007/0028220 A1 * 2/2007 Miller et al. ................... 717/124
2010/0155634 A1 * 6/2010 do Amaral et al. ...... 251/129.01

FOREIGN PATENT DOCUMENTS

EP 1455313 A1 9/2004

OTHER PUBLICATIONS

Official Action in related European Application No. 13158862.6, dated Aug. 23, 2013, 9 pages.
Kirkland L V et al., "Avionics health management: searching for the prognostics grail," Aerospace Conference, 2004 IEEE Proceedings, Piscataway, NJ, Mar. 3, 2009, 8 pages.(month is not available).

* cited by examiner

Primary Examiner — Tan Q Nguyen

(57) ABSTRACT

According to one embodiment, an aircraft part environmental stress analysis system includes a part failure repository, a part history repository, and a failure analysis engine. The part failure repository is configured to store a plurality of failure records, each failure record identifying a failed aircraft part. The part history repository is configured to store a plurality of part records, each part record storing, for a failed aircraft part, at least one measurement of an aspect of a natural environment of which the failed aircraft part was subject to. The failure analysis engine is operable to compare the plurality of failure records to the plurality of part records and identify at least one potential environmental cause of failure for a plurality of failed aircraft parts based on the comparison.

8 Claims, 2 Drawing Sheets

| TIME | MEASUREMENT TYPE | MEASUREMENT VALUE | DATA SOURCE | DATA CONFIDENCE | AIRCRAFT |
|---|---|---|---|---|---|
| 41065.77 | HUMIDITY | 80% | SENSOR 4 | 8 | NXXXXX |
| | | | | | |
| | | | | | |
| | | | | | |

US 8,774,988 B2

AIRCRAFT ENVIRONMENTAL SENSORS AND SYSTEM

TECHNICAL FIELD

This invention relates generally to environmental stress on aircraft, and more particularly, to aircraft environmental sensors and system.

BACKGROUND

An aircraft may operate in many different natural environments and thus subject its components to many different environmental stresses. One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to collect and record environmental condition information about aircraft parts during operation of the aircraft. A technical advantage of one embodiment may include the capability to determine how different types of parts fail based on the environmental conditions that those parts were subject to. A technical advantage of one embodiment may also include the capability to determine when parts should be replaced or repaired prior to failure.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figures 1, 3:
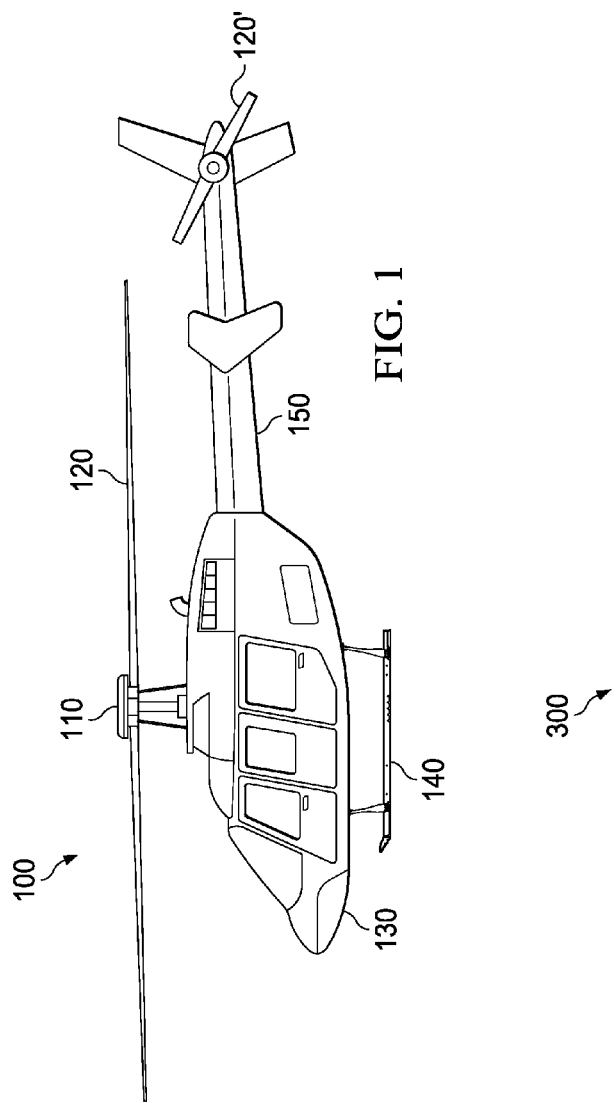
FIG. 1 shows a rotorcraft according to one example embodiment.
FIG. 3 shows a part record that may be stored and analyzed by the aircraft part environmental stress analysis system of FIG. 2.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft other than rotorcraft, such as airplanes and unmanned aircraft, to name a few examples.

Rotorcraft 100 may operate in many different natural environments and thus subject its components to many different environmental stresses. For example, rotorcraft 100 may operate in tropical environments where the air is more saturated with humidity. As another example, rotorcraft 100 may operate in marine environments where the air has higher levels of salinity, which may cause corrosion. As yet another example, rotorcraft 100 may operate in deserts where sand and other particulates may wear down rotorcraft components.

Such environmental stresses are not limited to when rotorcraft 100 is flying. For example, operation of rotorcraft 100 in a desert environment may include both flying rotorcraft 100 and parking rotorcraft 100 between flights. In this example, both flying and parking rotorcraft 100 may subject rotorcraft 100 to sand and other particulates.

Overall damage to rotorcraft 100 may depend on the severity of exposure to environmental stresses. For example, damage may result from prolonged exposure from environmental stresses. In addition, damage may result from extreme exposure to environmental stresses, even if such exposure is short-lived. Furthermore, some parts on rotorcraft 100 may be more susceptible to prolonged exposure to environmental stresses, whereas other parts may be more susceptible to extreme environmental stresses.

Aircraft parts may be designed to withstand expected environmental stresses. Different aircraft may fly in many different environments, however. Some aircraft may be exposed to more environmental stresses, whereas other aircraft may be exposed to less environmental stresses.

Teachings of certain embodiments recognize the capability to measure and analyze environmental stress on aircraft parts during operation of the aircraft. Teachings of certain embodiments also recognize the ability to use environmental stress information to determine how aircraft parts fail and to determine when aircraft parts should be replaced.

Figure 2:
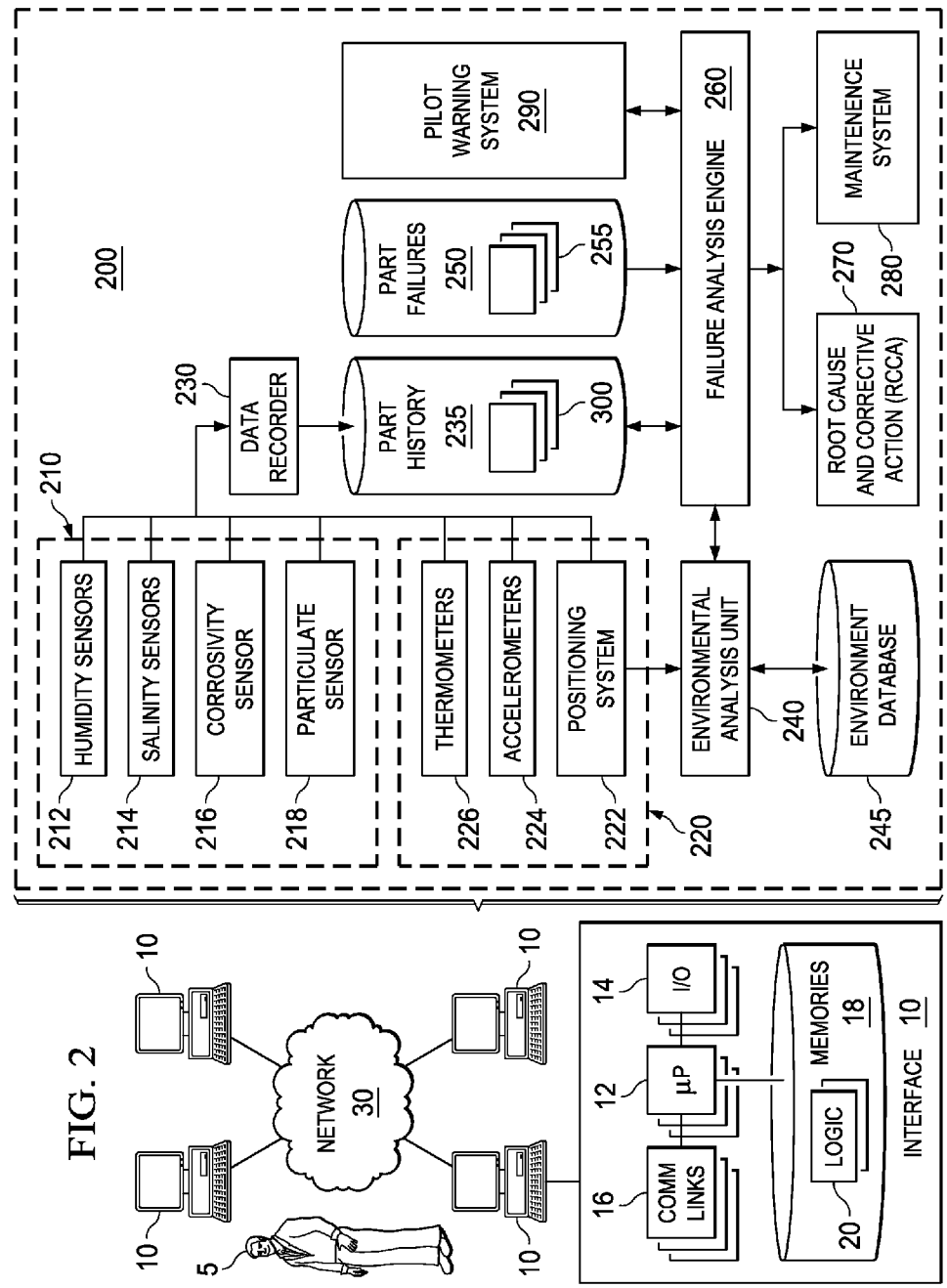
FIG. 2 shows an aircraft part environmental stress analysis system according to one example embodiment.

FIG. 2 shows an aircraft part environmental stress analysis system 200 according to one example embodiment. In general, system 200 features environmental condition sensors 210, a aircraft inputs 220, a data recorder 230, a part history repository 235, an environmental analysis unit 240, an environment database 245, a part failures repository 250, a failure analysis engine 260, a root cause and corrective action (RCCA) engine 270, a maintenance system 280, and a pilot warning system 290, that may be implemented by one or more computer systems 10.

All, some, or none of the components of system 200 may be located on or near rotorcraft 100 (or another aircraft). For example, in one example embodiment, environmental condition sensors 210 are located at various locations on rotorcraft 100, and aircraft inputs 220 and pilot warning system 290 may represent systems incorporated into rotorcraft 100. In some embodiments, data recorder 230 may be located local to or remote from rotorcraft 100.

Users 5 may access system 100 through computer systems 10. For example, in some embodiments, users 5 may access part history repository 235, environmental analysis unit 240, environment database 245, part failures repository 250, failure analysis engine 260, RCCA engine 270, and maintenance system 280 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Environmental condition sensors 210 measure aspects of the natural environment of which rotorcraft 100 is subject to. In some embodiments, environmental condition sensors 210 are located at various positions on or in rotorcraft 100. In some embodiments, environmental condition sensors 210 may be concentrated near aircraft parts that may be prone to failure due to environmental stresses. In addition, environmental condition sensors 210 may be located in enclosed areas within rotorcraft 210. As one example, a humidity sensor may be located in areas within rotorcraft 100 where humidity may build up due to humidity in the air surrounding rotorcraft 100.

In the example of FIG. 2, environmental condition sensors 210 include humidity sensors 212, salinity sensors 214, corrosivity sensors 216, and particulate sensors 218. Humidity sensors 212 are operable to measure humidity in the atmosphere proximate to the aircraft. Salinity sensors 214 are operable to measure salinity in the atmosphere proximate to the aircraft. Corrosivity sensors 216 are operable to measure existence of corrosive substances proximate to the aircraft or conditions favorable for corrosion proximate to the aircraft. Particulate sensors 218 are operable to measure existence of particulates proximate to the aircraft. Particulate sensors 218 may also measure the size and density of particulates, as well as other information.

In some embodiments, environmental condition sensors 210 may be "sacrificial" sensors. Sacrificial sensors are sensors that are permanently altered after performing one or more measurements such that the sacrificial sensor must be replaced before performing additional measurements. For example, some corrosivity sensors 216 may detect corrosion of nearby parts by itself becoming corroded. In some embodiments, measurements from sacrificial sensors may be collected by user 5 or by data recorder 230 at the time of replacement. In some embodiments, these measurements may be associated with an approximate timestamp, indicating when the measurements are believed to have been taken. Alternatively, measurements may be associated with a known period of exposure based on an installation timestamp (indicating when the sensor was installed) and a removal timestamp.

In some embodiments, other environmental condition sensors 210 may be included in addition to humidity sensors 212, salinity sensors 214, corrosivity sensors 216, and particulate sensors 218. For example, in some embodiments, environmental condition sensors 210 may include pressure sensors and vibration sensors. Pressure sensors may measure and determine information such as ambient air pressure (or pressure altitude) and dynamic air pressure (such that airspeed may be determined). Vibration sensors may measure vibration at various locations throughout the aircraft. In some embodiments, vibration sensors may be located proximate to parts that are known to fail due to high vibration loads.

Aircraft inputs 220 may represent systems that provide additional information about an aircraft during operation of the aircraft. In the example of FIG. 2, aircraft inputs 220 include a positioning system 222, accelerometers 224, and thermometers 226. Positioning system 222 provides the location of the aircraft. One example of positioning system 222 may include a global positioning system (GPS). In another example, positioning system 222 is an on-board inertial navigation system. In yet another example, positioning system 222 includes off-board equipment that determines the location of an aircraft during operation based on flight plan and other information. For example, positioning system 22 may receive information identifying the departure and arrival information for each flight and then determine the locations of the aircraft in route to the destination. In some embodiments, this departure and arrival information may be manually provided by user 5.

Accelerometers 224 measure acceleration of the aircraft or of various parts of the aircraft. For example, an airplane may be subject to different accelerations at its fuselage as compared to its wing tips. Thermometers 226 measure the temperature proximate to the aircraft. In some embodiments, thermometers 226 may measure outside air temperatures and inside air temperatures. In some embodiments, thermometers may also be included as sensors 210. For example, thermometers may be added in various locations about the aircraft, such as inside an avionics box to detect a localized build-up of heat. In some embodiments, temperature information from thermometers 226 may be used to correct air data for true airspeed and density altitude.

Data recorder 230 receives information from environmental condition sensors 210 and aircraft inputs 220 and stores the information in part history repository 235. Teachings of certain embodiments recognize that parts in an aircraft are often replaced, and parts from one aircraft may be reinstalled into another aircraft. Thus, maintaining environmental history of an aircraft alone may not provide sufficient information about each part. Accordingly, in some embodiments, data recorder 230 receives information regarding an aircraft and assigns the information to one or more parts associated with the aircraft.

In one example embodiment, data recorder 230 populates part records 300. An example part record 300 is shown in FIG. 3. A part record 300 may include information detailing the environmental history of a specific part. In some embodiments, the specific part may be identified by a serial number or other unique identifier.

In the example of FIG. 3, part record 300 features a timestamp identifying when an environmental condition was measured (or alternatively, indicating a known period of exposure). Teachings of certain embodiments recognize that timestamping each environmental condition measurement may allow for a more complete understanding of the environmental history of the part. For example, timestamping may indicate the duration of environmental stresses or operational age of the part.

In the example of FIG. 3, part record 300 also includes the type of environmental condition measurement, a value of the measurement, identification of the sensor performing the measurement, a confidence level of the measurement, and identification of the aircraft in which the part was installed when the measurement was taken. In some embodiments, part history repository 235 may be in communication with an aircraft configuration database that tracks what parts are installed on each aircraft at the time data is collected. In this example, part record 300 may integrate part history from the aircraft configuration database with environmental data collected by sensors 210. In other embodiments, the aircraft in which a part was installed during data collection may be identified during the process of uploading data collected by sensors 10. As one example, user 5 may manually identify the aircraft when manually uploading data collected by sensors 210 (e.g., when manually uploading data collected by sacrificial sensors).

Teachings of certain embodiments recognize that some entries in part history 300 merit higher confidence than others. As one example, different types of sensors 210 may be more accurate than others. As another example, part record 300 may include approximations of environmental history when measurements from sensors 210 are not available. These approximations may not be as accurate as information from sensors 210 and thus may be assigned a lower confidence level. In some embodiments, data from sensors 210 may be used to identify the confidence level in the approximations. For example, if historically the approximations closely resemble measurements from sensors 210, then the approximations may merit a confidence level close to the confidence of measurements from sensors 210.

For example, environmental analysis unit 240 may approximate environmental conditions such as humidity and salinity based on the location of the aircraft. In the example of FIG. 3, environmental analysis unit 240 receives the location of an aircraft from positioning system 222. Environmental analysis unit 240 may then consult environment database 245 to determine the environmental conditions at the location (and time) received from positioning system 222. Environment database 245 may include information identifying environmental conditions at particular places and times. Environmental analysis unit 240 may retrieve the environmental conditions from environment database 245 for particular locations and times at which the aircraft operated. These retrieved environmental conditions may be used in place of or in addition to measurements from sensors 210 and aircraft inputs 220.

Teachings of certain embodiments recognize the capability to update environment database 245 using information from environmental condition sensors 210. For example, if an aircraft is known to have been at a certain location at a certain time, the data from environmental condition sensors 210 may be added to environment database 245.

Part failures repository 250 stores part failure records 255. Part failure records 255 identify a failed part and may provide one or more details about the failure. For example, part failure records 255 may include information from a failure incident report, which describes a part after it has suffered a failure. For example, the failure incident report might describe physical damage, include measurements and data about the part after damage, and describe the circumstances surrounding failure (e.g., when and where the part failed).

Part failure records 255 may describe parts also described in part records 300. For example, each part failure record 255 may have a corresponding part record 300. Teachings of certain embodiments recognize, however, that there may not always be a one-to-one correspondence. As one example, part history repository 235 may include part records 300 for parts that have not failed. In addition, part failure repository 250 may include part failure records 255 for parts that do not have any corresponding records in part history repository 235.

Failure analysis engine 260 may compare part failure records 255 to part records 300. In some embodiments, failure analysis engine 260 may identify correlations between part failures described in part failure records 255 and environmental conditions described in part records 300. In some embodiments, failure analysis engine 260 may filter information about parts based on environmental conditions, failure information, or other criteria. In addition, failure analysis engine 260 may present a user interface to user 5 that allows user 5 to set the criteria for various filters.

RCCA 270 may analyze environmental and failure part information across multiple parts and propose a potential cause of failure for one or more failed parts. In addition, RCCA 270 may determine whether the failed part may be repaired and recommend a corrective action to repair the part. In some embodiments, RCCA 270 may propose a potential cause of failure based on which environmental conditions appear to be the leading factors in part failure. For example, if a certain part type frequently fails after exposure to high salinity for long periods of time, RCCA 270 may identify the salinity exposure as a potential cause of failure.

Maintenance system 280 may identify parts that are approaching end of life. In particular, maintenance system 280 may use environmental information from part records 300 to determine whether environmental stresses on a particular part make that part due for replacement. For example, if certain environmental stresses are known to cause failure in a part (e.g., as identified by RCCA 270), maintenance system 280 may recommend replacement of the part prior to failure. In some embodiments, maintenance system 280 may predict upcoming replacement times and order parts such that they will be available for installation when repair time arrives. In addition, maintenance system 280 may even predict how many parts should be manufactured based on how many parts are in service and how long those parts are expected to remain in operation.

In some embodiments, maintenance system 280 may identify localized conditions on the aircraft which may be abnormal (e.g., high humidity inside a sealed box) that could lead to premature failure if the condition is left untreated. In this example, maintenance system 280 may alert a maintenance crew to fix the problem (e.g., replace a seal in the sealed box) and avoid additional exposure. In this manner, maintenance system 280 may prevent early failure due to environmental conditions.

In some circumstances, parts may have an expected lifespan based on laboratory and flight testing. Teachings of certain embodiments recognize, however, that system 200 provides a much larger sample size of testing data because it can analyze performance of parts during operation of an aircraft. Accordingly, RCCA 270 and maintenance system 280 may also verify or change the expected lifespan of a part determined from laboratory or flight testing.

Pilot warning system 290 may alert a pilot of an aircraft that the aircraft is in an environmentally dangerous area. For example, if certain environments are so extreme that even limited exposure leads to part failure, pilot warning system 290 may alert the pilot so that the pilot has an opportunity to leave the area. In one example embodiment, pilot warning system 290 alerts the pilot if an environmental condition exceeds a threshold. For example, pilot warning system 290 may alert the pilot if salinity or corrosivity exceeds an allowable amount. Examples of a pilot alert may include, but are not limited to, an audible noise or a visual indication. In some embodiments, the pilot alert may not only identify that a threshold has been pass but also indicate the severity (e.g., warning and danger alerts or identifying the environmental condition measurement).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An aircraft part environmental stress analysis system, comprising:
    a part failure repository configured to store a plurality of failure records, each failure record identifying a failed aircraft part;
    a part history repository configured to store a plurality of part records, each part record storing, for a failed aircraft part, at least one measurement of an aspect of a natural environment of which the failed aircraft part was subject to; and
    a failure analysis engine operable to:
        compare the plurality of failure records to the plurality of part records; and
        identify at least one potential environmental cause of failure for a plurality of failed aircraft parts based on the comparison.

2. The aircraft part failure analysis system of claim 1, each failure record further identifying a categorization of the failed aircraft part.

3. The aircraft part failure analysis system of claim 2, the failure analysis engine further operable to identify at least one potential environmental cause of failure for a plurality of failed aircraft parts sharing a common categorization.

4. The aircraft part failure analysis system of claim 2, wherein the categorization is a categorization of aircraft part type.

5. The aircraft part failure analysis system of claim 2, wherein the categorization is a categorization of part failure type.

6. The aircraft part failure analysis system of claim 1, further comprising a maintenance system operable to project when other parts in operation and belonging to the categorization should be replaced based on the identification of the at least one potential environmental cause.

7. The aircraft part failure analysis system of claim 1, wherein the part history repository is configured to receive the at least one measurement from a sensor located on the aircraft.

8. The aircraft part failure analysis system of claim 1, wherein the part history repository is configured to receive the at least one measurement from an environment database, the environment database comprising environment records for a plurality of locations at a plurality of times, the part history repository configured to receive the at least one measurement for a particular location and a particular time at which the aircraft operated.

* * * * *